US 6,564,166 B1

(12) United States Patent
Ume et al.

(10) Patent No.: US 6,564,166 B1
(45) Date of Patent: May 13, 2003

(54) PROJECTION MOIRÉ METHOD AND APPARATUS FOR DYNAMIC MEASURING OF THERMAL INDUCED WARPAGE

(75) Inventors: Ifeanyi Charles Ume, Atlanta, GA (US); Gregory James Petriccione, Acworth, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 184 days.

(21) Appl. No.: 09/611,394

(22) Filed: Jul. 7, 2000

Related U.S. Application Data
(60) Provisional application No. 60/161,645, filed on Oct. 27, 1999.

(51) Int. Cl.⁷ .......................... G01K 17/00; G06F 15/00
(52) U.S. Cl. ....................................... 702/136
(58) Field of Search ............................ 702/136; 374/57

(56) References Cited

U.S. PATENT DOCUMENTS

| | | | | |
|---|---|---|---|---|
| 4,111,643 A | * | 9/1978 | Welland | 432/36 |
| 4,752,216 A | * | 6/1988 | Hurrell | 432/152 |
| 5,601,364 A | * | 2/1997 | Ume | 250/237 G |
| 5,714,832 A | * | 2/1998 | Shirrod et al. | 310/328 |

* cited by examiner

Primary Examiner—John Barlow
Assistant Examiner—Anthony T. Dougherty
(74) Attorney, Agent, or Firm—Thomas, Kayden, Horstemeyer & Risley, L.L.P.

(57) ABSTRACT

The projection moiré and temperature controlled chamber system houses a workpiece in the chamber and subjects the workpiece to changing temperatures according to a predefined temperature/time profile. As the workpiece is subjected to changing temperatures, a projection moiré system projects a plurality of moiré fringe patterns onto the workpiece, and a camera detects thermally induced warpage in the workpiece. The detection of thermally induced warpage, indicated by changes in the projected fringe moiré patterns on the workpiece, is analyzed by a processing unit. The temperature controlled chamber includes a plurality of heating sources, at least one cooling source, temperature probes and an adjustable support frame. Output temperature of the heating/cooling sources may be variable. The position of the support frame is adjustable and controlled by the processor in a manner such that a reference point associated with the workpiece or the frame is held in a stationery manner. The chamber may also include a plurality of air blowers and exhaust vents to facilitate temperature control within the chamber. An alternative embodiment includes a supplemental shadow moiré system.

35 Claims, 6 Drawing Sheets

PROJECTION MOIRÉ METHOD AND APPARATUS FOR DYNAMIC MEASURING OF THERMAL INDUCED WARPAGE

CLAIM OF PRIORITY

This document claims priority to and the benefit of the filing date of co-pending and commonly assigned provisional application "METHOD AND APPARATUS FOR MEASURING THERMAL WARPAGE USING PROJECTION MOIRE," assigned Ser. No. 60/161,645, filed Oct. 27, 1999, and hereby incorporated herein by reference.

TECHNICAL FIELD

The present invention is generally related to a method and apparatus for measuring warpage in a specimen and, more particularly, is related to a method and apparatus using a projection moiré technique to measure warpage in a temperature controlled environment which simulates on-line manufacturing processes or facilitates laboratory development processes.

BACKGROUND OF THE INVENTION

The surface flatness of objects, such as printed circuit boards, integrated circuit (IC) packages, ceramic and metal substrates, papers, plastics, woven items and the like, can be very important and is often of special concern. For example, the manufacture of printed circuit boards, IC packages and other electronic interconnection products is a multi-billion dollar global industry, and the flatness of these products is critical to their ability to undergo further manufacturing steps and to their ultimate reliability in operation as parts of computer, automobile, telecommunications, aerospace, military and other electronic systems. Non-flatness, or warpage, is a frequent problem in manufacturing due to inadequacies in design, materials, and/or processing of components, which are typically complex devices composed of several different materials. The ability to analyze surface flatness, especially changes in surface flatness (warpage) associated with changing temperatures, plays an important role in the designing, manufacture, processing and maintaining of objects for which surface flatness is an important characteristic.

One method of analyzing surface flatness is projection moiré interferometry. Projection moiré is a full-field, non-contact method of measuring out-of-plane displacements for in-plane deformations of a structure. A typical projection moiré fringe pattern is a series of light and dark fringe lines of equal change in surface position which map out the contour change of an object much the same way a topography map delineates the contour of land. FIG. 1 illustrates a simplified projection moiré system 20. Generally, projection moiré interferometry fringe lines are formed by a plurality of phase shifted laser beams 22 projected onto a workpiece 24. A laser 26 generates a laser beam 28 which is projected into a shearing interferometer 30. The laser beam 28 is expanded by beam expander 32 and transmitted to beam splitter 34. The shearing interferometer 30 is thus able to generate a plurality of interfering laser beams that form fringe patterns fanning out onto workpiece 24. The spatial frequency of the fringes may be adjustable to a desired horizontal and/or vertical spacing. Some projection moiré systems employ an actuated mirror (not shown) which sweeps the beam 22 across workpiece 24 in a manner which further improves the analysis of the moiré patterns projected onto workpiece 24. A camera 36 detects the moiré fringe patterns and provides the image of the workpiece 24 and the projected fringe patterns to processor 38. The image detected by camera 36 is displayed on the video display screen 40. The operator may interface with and/or control the projection moiré system and camera through an interface, such as keyboard 42.

Shadow moiré fringe analysis is another fringe pattern analysis technique employing a light source projected through a glass plate having overlaying grating lines (reference grating) which are projected onto the workpiece as specimen gratings. The interference of the reference and specimen gratings produce moiré fringes. Like the projection moiré method, a camera captures the fringe image created by the shadow moiré system and a processor processes the images detected by the camera.

Typically, an image of an un-deformed workpiece 24 (FIG. 1) is recorded by the camera 36 and stored within processor 38 for comparison against a deformed workpiece 24 (or the same workpiece 24 after deformation). By comparing the differences in the projected fringe patterns on the un-deformed and the deformed workpiece 24, the nature of any warpage and/or deformations in the workpiece 24 can be analyzed. However, the technique of comparing a deformed workpiece with an un-deformed workpiece (or comparing a change in deformation in the same workpiece) limits the analysis to two static points in time. That is, two views of a workpiece 24 are compared. For example, images of the initial un-deformed conditions and the subsequent deformations of workpiece 24 after a process may be compared.

The deformations experienced by a workpiece 24 as the workpiece is subjected to a process cannot be analyzed with this static projection moiré analysis approach. A dynamic analysis approach would provide a much better overall picture of the deformation process. For example, if the workpiece is a printed circuit board traveling down an assembly line through a series of reflow oven zones wherein various components are soldered to the circuit board, the circuit board would presumably start out in an initial un-deformed state, and then be subjected to a series of heating and cooling cycles which may induce various degrees of warpage at various locations on the circuit board at different times during the process as the electronic components are soldered to the printed circuit board.

Furthermore, tracking a workpiece 24 with a camera 36 and a projection moiré system 20 as the workpiece travels down the manufacturing assembly line presents numerous and nearly insurmountable difficulties. The oven enclosures which solder components to the circuit board provide restricted access to the projection moiré system 20. If a single projection moiré system 20 is used, the laser 26, shearing interferometer 34, and camera 36 need to travel along the same path as the workpiece in a manner such that fringe patterns can be projected on the workpiece 24 and detected by camera 36 during the entire manufacturing process, including the soldering process conducted inside of the oven enclosures. Alternatively, a plurality of projection moiré interferometer systems 20 might be used at preselected locations along the manufacturing assembly line, however, this approach would have the higher costs of having multiple lasers 26, shearing interferometers 30 and cameras 36. Also, difficulties will have to be overcome in image synchronization between the plurality of cameras spaced along the assembly manufacturing line. Additionally, any of the projection moiré systems 20 viewing the workpiece 24 in an oven enclosure would have to overcome special design problems associated with operation in the high temperature environment of an oven enclosure. Thus, the above-described prior art projection moiré analysis method is not practically able to dynamically detect and analyze the entire warpage process that a workpiece 24 may be subjected to during a manufacturing process.

One prior art technique employs a shadow moiré analysis system in which a work sample is placed in a heating chamber. The shadow moiré illumination source is directed into the heating chamber and onto the sample. Subsequently, the temperature in the heating chamber. may be adjusted over time to approximate a predefined temperature/time profile. The camera captures the entire deformation process as the workpiece is subjected to changes in temperature during the simulation of the temperature/time profile. The temperature/time profile in the heating chamber can be designed to simulate an actual manufacturing process, or be specified such that a process engineer can conduct laboratory experiments for use in process and manufacturing method design. The use of a heating chamber for housing and heating a sample for analysis by a shadow moiré system is taught in Ume, U.S. Pat. No. 5,601,364, which is incorporated herein by reference. However, the shadow moiré analysis system taught in Ume contains a single fixed heating source and a single variable heating source. It would be desirable to have additional flexibility in the heating sources, a way to circulate air within the chamber, a way(s) to cool the chamber, and the equally accurate projection moiré method.

Under certain conditions, a projection moiré system is known to provide a more accurate analysis method than the shadow moiré methods. Thus, it would be desirable to have an apparatus and system which could dynamically analyze the warpage of a workpiece as the workpiece is subjected to a varying temperature/time profile. Furthermore, it would be advantageous to provide for a variety of heating means and cooling means whereby the predefined temperature/time profile could be more accurately simulated.

SUMMARY OF THE INVENTION

One embodiment of the present invention is a projection moiré method for measuring thermally induced warpage in a workpiece. The workpiece is first placed in the chamber. Next, a grating pattern is projected into the chamber and onto the workpiece. The projected grating pattern forms a fringe pattern on the workpiece, while a camera captures the resulting fringe pattern. Subsequently, the temperature in the chamber is adjusted to approximate a predefined temperature/time profile. The camera records a continuous series of images of the fringe patterns formed due to the deformation of the workpiece during the temperature/time profile simulation, while recording the corresponding temperature and time. Finally, the warpage of the workpiece can be determined by analyzing the sequence of images captured during simulation of the predefined temperature/time profile.

One embodiment of the present invention has a chamber for housing a workpiece, a projection moiré system and a temperature control system. The chamber has a glass top for viewing the workpiece which has been placed in the chamber, a plurality of heating sources and at least one cooling source. The temperature control system employs a processor which controls a plurality of heaters, coolers and fans residing in the chamber such that temperature within the chamber can be regulated according to a predefined temperature/time profile. The heating and/or cooling sources may have a variable output temperature.

The present invention can also be conceptualized as providing one or more methods for subjecting a workpiece to changing the temperature and recording warpage of the workpiece using a projection moiré system. In accordance with one method of the invention, the method may be broadly summarized by the following steps: positioning a workpiece in a chamber; projecting a plurality of grating patterns on the workpiece; regulating temperature in the chamber; recording images of the fringe patterns formed on the workpiece; and analyzing changes in the plurality of fringe patterns.

Other systems, methods, features, and advantages of the present invention are or will become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

Figure 1:
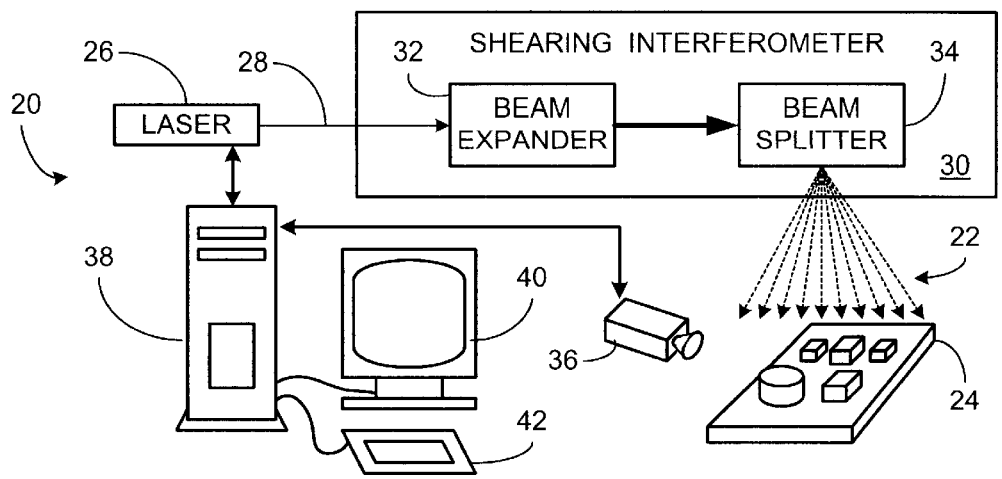
FIG. 1 is a schematic of a prior art projection moiré apparatus for measuring warpage of a workpiece.

Reference will now be made in detail to the description of the present invention as illustrated in the drawings, while the present invention will be described in connection with these drawings, there is no intent to limit the present invention to the embodiment or embodiments disclosed therein. On the contrary, the intent is to cover all alternatives, modifications and equivalents included within the spirit and scope of the invention as defined by the appended claims.

DETAILED DESCRIPTION OF THE INVENTION

Figure 2:
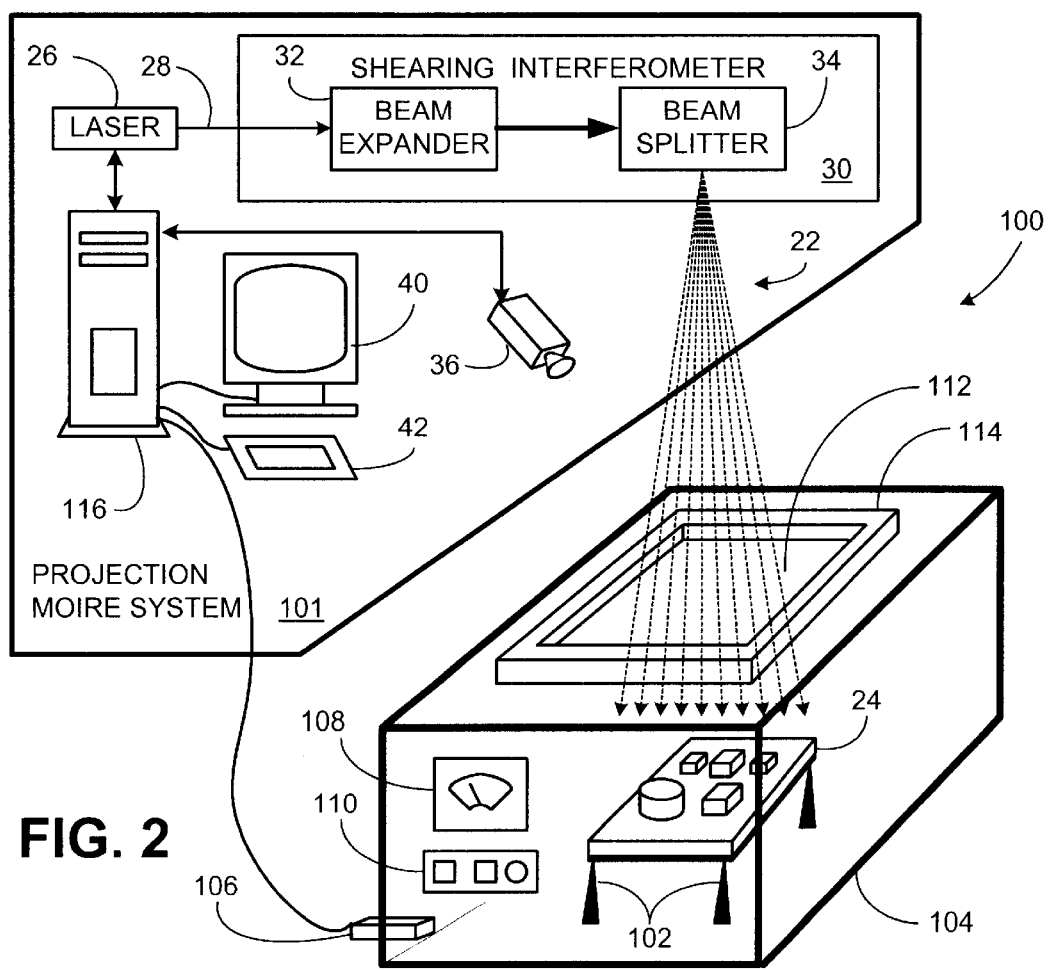
FIG. 2 is a schematic of the projection moiré and temperature controlled chamber system of the present invention housing a workpiece.

FIG. 2 is a simplified illustrative view of the preferred embodiment of a projection moiré and temperature controlled chamber system 100 having a projection moiré system 101 and a chamber 104. Elements in FIG. 2 that are similar to those in FIG. 1 bear the same reference numerals. Such elements having the same reference numerals in FIGS. 1 and 2 may be considered to be like elements, however, one skilled in the art will realize that the elements in FIGS. 1 and 2 not need be identical, as any variations of such elements will not adversely affect the functioning and performance of the projection moiré and temperature controlled chamber system 100. Therefore, like elements are like-numbered and will not be described again in detail.

The preferred embodiment projection moiré and temperature controlled chamber system 100 preferably includes a workpiece support frame 102 and a chamber 104 that are interconnected. Interconnecting the frame 102 to the chamber 104 ensures accurate and stable positioning of the workpiece 24. The projection moiré and temperature controlled chamber system 100 is able to execute projection moiré experiments, thereby enabling measurement of warpage and/or out-of-place surface displacements of workpiece 24 as the workpiece 24 is subjected to temperature variations according to a predefined temperature/time profile. A predefined temperature/time profile is a series of predefined temperatures, which may be different, associated with a series of times in a time period.

The chamber 104 is equipped with a plurality of heating and/or cooling sources (not shown). Selection from a plurality of heating and/or cooling sources allows for a more accurate thermal simulation according to a predefined temperature/time profile. Heating sources and/or cooling sources may be variable (having more than one output temperature). Control of the plurality of heating and/or cooling sources is effected by processor 116 which monitors the temperature of the inside of chamber 104 with temperature probe 106. In the preferred embodiment of the projection moiré and temperature control chamber system 100, temperature probe 106 is a type-J thermal couple, although any suitable temperature detection device may be employed. In the preferred embodiment, up to 12 channels of thermal couple data can be simultaneously collected from 12 different temperature probes (not shown). For example, temperature on or very near the workpiece, may be measured and used as the referenced temperature for the simulation of a temperature/time profile, as described hereinafter. Alternative embodiments of the projection moiré and temperature control chamber system 100 may use any number of temperature probes situated in convenient locations.

Chamber 104 further contains a temperature gauge 108 visible to the user and manual controls 110 which may be used to manually override temperature control provided by processing unit 116. Mounted on top of chamber 104 is a glass cover 112 mounted in a glass support frame 114. In the preferred embodiment of the projection moiré and temperature controlled chamber system 100, the glass support frame 114 is hingeably mounted (hinges not shown) to chamber 104 such that the glass support frame 114 and glass cover 112 may be opened upward and outward such that workpiece 24 can be positioned on workpiece support frame 102. After workpiece 24 has been properly positioned in chamber 104, the glass support frame 114 and glass cover 112 are lowered into the closed position as shown in FIG. 2 and secured in a manner that thermally seals the interior of chamber 104 from the outside environment. In the preferred embodiment of the projection moiré and temperature controlled chamber system 100, glass cover 112 is made of a suitable thermally resistive glass material.

In alternative embodiments of the projection moiré and temperature controlled chamber system 100, the glass cover 112 may be made of a plurality of glass panes separated by an insulated inert gas. In another alternative embodiment, a cover, door or access panel may be located in another convenient location on chamber 104 so that suitable access to the inside of chamber 104 is provided. Other alternative embodiments may have a plurality of viewing windows (not shown) such that the projection moiré system 98 can be repositioned to project fringe patterns along any desired access. For example, it may be desirable to view warpage of a workpiece along the vertical access. Alternative embodiments may also employ a plurality of projection moiré systems 101 to detect warpage along a plurality of planes of the workpiece 24. All such alternative embodiments which include any or all of the above-mentioned modifications and/or variations are intended to be included herein within the scope of the present invention and to be protected by the following claims.

As shown in the simplified illustrative diagram of FIG. 2, the laser 26 beams a laser beam 28 through shearing interferometer 30. Beam splitter 34 then projects a plurality of phase shifted laser beams 22 through glass cover 112 into the chamber 104 and onto workpiece 24. The plurality of phase shifted laser beams 22 projects a moiré fringe pattern (not shown) on workpiece 24. Camera 36 is positioned such that the moiré fringe pattern on workpiece 24 is visible through glass cover 112. A continuous series of images of the workpiece 24 and the moiré fringe patterns are captured by the camera and transmitted to processor 116 for storage and later analysis. In an alternative embodiment, the images captured by camera 36 may be stored on a VCR, a CD ROM, a recordable DVD or other suitable recording medium.

The projection moiré system 101 shown in FIG. 2 has many similar components as the projection moiré system 20 of FIG. 1. At least one significant improvement to projection moiré system 101 resides in processing unit 116. As will be described hereinafter, processing unit 116 controls temperatures in chamber 104 according to the predefined temperature/time profile. Also, processing unit 116 maintains the position of workpiece 24 or the position of workpiece support frame 102 at a fixed point in space in a manner described hereinafter. Thus, a position controller detects movement of the reference point and transmits commands to the adjustable support posts 122, such that the reference point is maintained at a fixed position in space.

Figure 3:
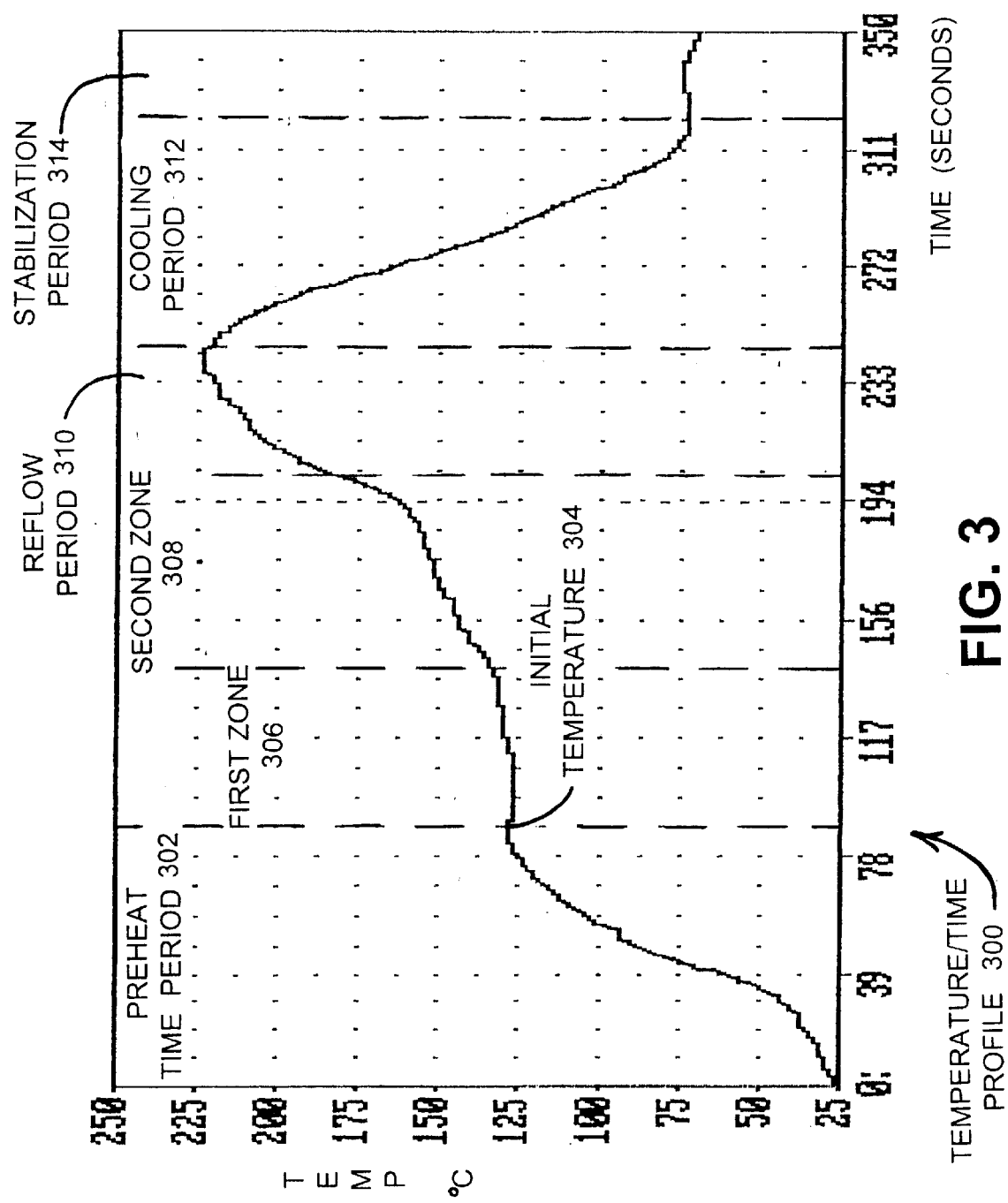
FIG. 3 is an illustrative predefined temperature/time profile simulated by the projection moiré and temperature control chamber system of FIG. 2.

FIG. 3 is an illustrative example of a predefined temperature/time profile 120 which may be simulated by the projection moiré and temperature control chamber system 100 (FIG. 2). The vertical axis represents temperature in degrees centigrade (° C.). The horizontal axis of the temperature/time profile 120 is in seconds. The preferred embodiment of the projection moiré and temperature control chamber system 100 can also simulate a temperature profile based upon degrees Fahrenheit (° F.). The preferred embodiment of the projection moiré and temperature control chamber system 100 may also interpret a temperature/time profile which employs other suitable time scales.

The temperature/time profile 120 shown in FIG. 3 is a simplified illustrative temperature vs. time profile which is used for convenience in explaining the operation of the projection moiré and temperature control chamber system 100. The predefined temperature/time profile 120 would be provided to processor 116 using any of the numerous methods typically employed in the arts to provide temperature/time profiles to a processing system. Six time periods are shown, for convenience, in the simplified illustrative temperature/time profile 120 of FIG. 3. The preheat time period 122 is from 0 seconds to approximately 78 seconds, wherein the temperature of the workpiece is increased from 25° C. to approximately 125° C. The second time period, denoted by the first zone 126, runs from approximately 80 seconds to approximately 140 seconds, wherein workpiece 24 is held at a substantially constant temperature of between 125° C. and 130° C. The third time period, denoted by the second zone 128, runs from approximately 140 seconds to 194 seconds, wherein the workpiece is heated from approximately 130° C. to approximately 160° C. The fourth time period, denoted as the reflow period 130, runs from approximately 194 seconds to approximately 240 seconds, wherein the workpiece is further heated from approximately 160° C. up to approximately 225° C. The fifth time period, denoted as cooling period 132, runs from approximately 240 seconds to 320 seconds, wherein the workpiece 24 is cooled from approximately 225° C. down to approximately 75° C. The last period, denoted as a stabilization period 134, runs from approximately 320 seconds to 350 seconds, wherein the workpiece 24 is maintained at an approximate constant temperature of 75° C. The simulation of the temperature/time profile 120 ends after 350 seconds.

For illustrative purposes, the temperature/time profile 120 shown in FIG. 3 is representative of an actual soldering process for a printed circuit board wherein a first plurality of electronic components are soldered to the circuit board during the first zone 126, and wherein a second plurality of components are soldered to the printed circuit board during the second zone 128. The reflow period 130 simulates the heating of the circuit board such that all of the components are securely soldered to the printed circuit board. Cooling period 132 simulates the cooling of the printed circuit board.

Alternatively, the predefined temperature/time profile 120 could have been defined to represent the temperature variations that any workpiece 24 may be subjected to during any type of manufacturing processes. Such manufacturing processes could be of shorter duration or longer duration than the illustrative temperature/time profile 120 shown in FIG. 3. Alternatively, the predefined temperature/time profile 120 may be used to simulate hypothetical manufacturing processes so that a process engineer may engineer a suitable manufacturing process for a workpiece 24.

Describing now in detail a simulation process according to FIG. 3, the simulation process begins with the positioning of workpiece 24 (FIG. 2) within chamber 104 (FIG. 2). The chamber 104 is preheated as shown by preheat time period 122, up to the initial temperature 124 of approximately 125° C. The actual temperature within chamber 104 is set according to the initial temperature 124 of the predefined temperature/time profile. Once the temperature within chamber 104 reaches the initial temperature 124, processing unit 116 (FIG. 2) instructs the plurality of heating and cooling sources (not shown) in a manner such that the predefined temperature/time profile 120 is simulated inside chamber 104. The workpiece 24 is heated during the periods of time associated with the first zone 126, second zone 128 and reflow period 130 by raising the temperature within chamber 104 using the plurality of heating sources. Should the actual temperature within chamber 104 exceed the temperature increases prescribed by the predefined temperature/time profile 120, the processor may select one or more of the following actions to either decrease actual chamber temperature or maintain actual chamber temperature in a manner such that the actual temperature in chamber 104 converges with the temperature specified by the predefined temperature/time profile 120; decreasing the amount of heat added by heating sources which are currently activated, deactivating any heat sources which are presently activated, deactivating higher output heat sources which are activated and concurrently activating lower output heat sources such that the total heat input into chamber 104 is reduced, changing the output temperature of a variable heating/cooling source, activating cooling source 136 to reduce the chamber temperature, or combining any or all of the above-mentioned actions. One skilled in the art will realize that the heating/cooling source selection and control logic 178 (FIG. 5) would be designed in a manner such that the actual temperature within chamber 104 closely matches the temperature specified by the predefined temperature/time profile 120.

During the simulation of the predefined temperature/time profile, a user stationed at keyboard 42 may oversee and manage the simulation. For example, the simulation process may go awry such that the user may order processor 38 to terminate the simulation. The user may also view various graphs, plots and camera views during the simulation. These graphs, plots and camera views are provided by software executed by processor 116.

As previously described, prior art projection moiré techniques compare fringe patterns associated with a workpiece before application of thermal stresses which induce warpage with a workpiece that has been subjected to thermal stress. The prior art projection moiré system can not record nor analyze warpages that may occur during the process of subjecting the workpiece to the thermal stresses which result in warpage. Using the projection moiré and temperature control chamber system 100 (FIG. 2), warpages of workpiece 24 induced by the changing thermal stresses applied to the workpiece can now be captured by camera 36 (FIG. 2) and dynamically analyzed by processor 116. Furthermore, warpage can be detected and analyzed during periods of extreme thermal stress, such as when workpiece 24 is inside a heating oven during reflow period 130 and subjected to a temperature of approximately 225° C. or higher. This dynamic analysis of the warpage may be conducted on a real-time basis and/or at a later time after conclusion of the simulation of the temperature/time profile 120 (FIG. 3). Such a simulated temperature/time profile 120 may be based upon actual measurements taken during the manufacturing process. Or, alternatively, hypothetical temperature/time profiles may be defined such that the process design engineer can study the nature and effect of induced warpages on a workpiece so that improved manufacturing processes can be designed.

Figure 4:
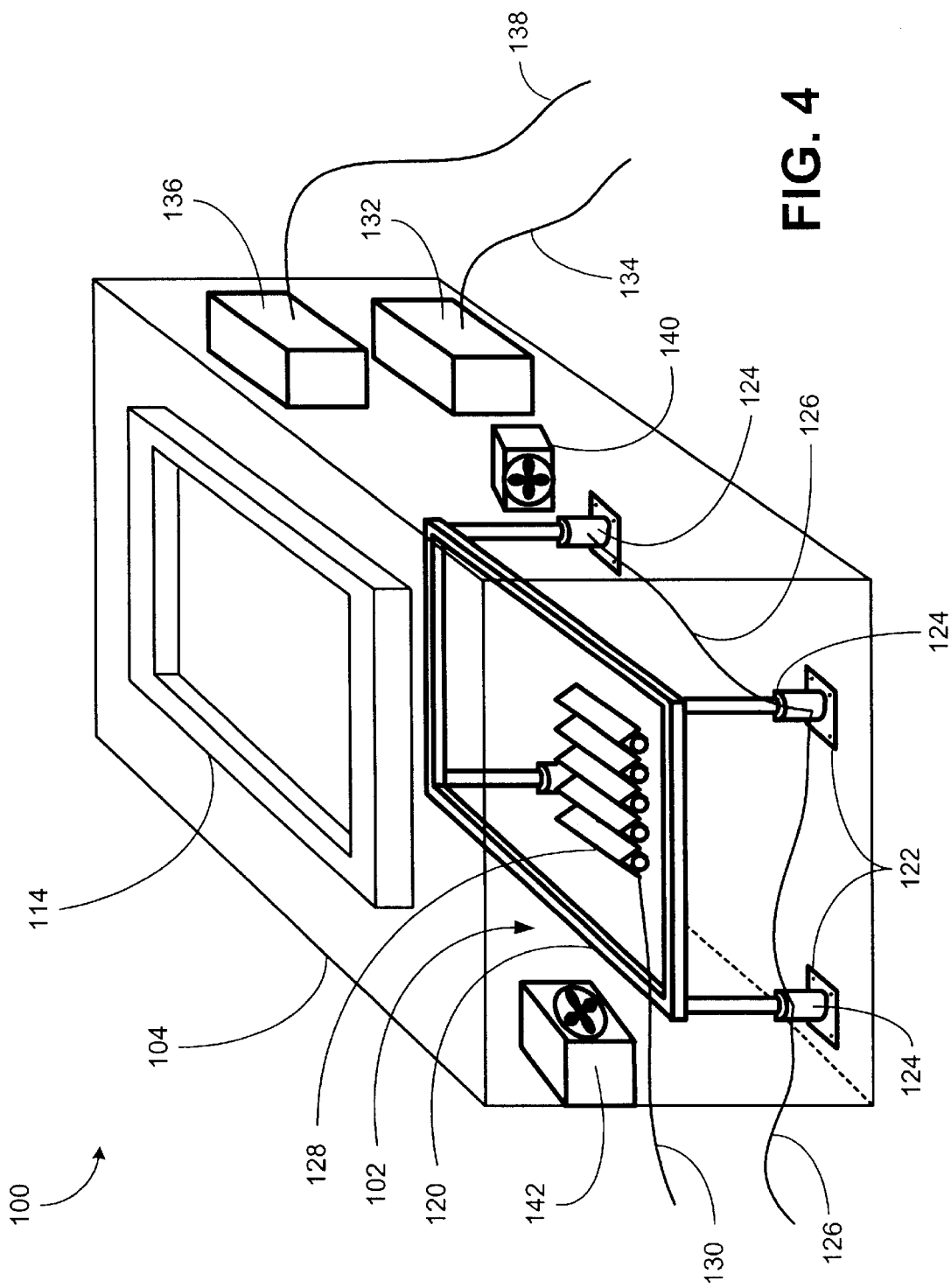
FIG. 4 is a detailed view of the chamber of FIG. 2 illustrating the workpiece support system and temperature control elements of the preferred embodiment of the projection moiré and temperature control chamber system.

FIG. 4 illustrates in more detail components of chamber 104. The workpiece support frame 102, in the preferred embodiment, has a frame 120 constructed of a suitable material which exhibits minimal deformation under changing temperature conditions. Typically, support rods (not shown) are positioned on top of frame 120 in a manner such that the workpiece 24 (not shown) can be positioned inside chamber 104. The support rods are typically constructed of the same or similar materials used in the frame 120. Frame 120 is supported by four supporting posts 122 which are firmly anchored to the floor of chamber 104. Each supporting post 122 may be adjusted by a pneumatic controlled piston 124 in a manner that stabilizes frame 120 during the simulated temperature/time profile. Control cables 126 connect the pneumatic controlled pistons 124 such that the individual positioning of each support post 122 can be accurately controlled by processing unit 116 through necessary adjustments to their respective pneumatic controlled piston 124. Control of the pneumatic controlled pistons 124 is implemented through any commonly employed piston control method used in the arts. Likewise, alternative embodiments of the workpiece support frame 102 may employ adjustable supporting posts 122 which are adjusted using other well known techniques. Such techniques may include servo motor controllers, stepping motor controllers, telescoping support posts, jack posts, screw posts, linear activators or the like.

Suitable clips or fasteners (not shown) may be used to firmly secure the support rods (not shown) and the workpiece (not shown) to frame 120 such that a reference point (not shown) on the workpiece or the frame 120 remains stationery. Position detectors (not shown) are used to detect any movement in frame 120, and/or the support rods, and/or the workpiece. Any detected motion may be compensated for by the adjustment of the supporting posts 122 in a manner such a that the reference point on the workpiece and/or the frame remains stationery throughout the simulation of the predefined temperature/time profile. A proportion integral derivative (PID) controller is used by the preferred embodiment to facilitate the stabilization of frame 120. Thus, a position controller detects movement of the reference point and transmits commands to the adjustable support posts 122, such that the reference point is maintained at a fixed position in space.

A high-temperature ball joint (not shown) may be positioned between frame 120 and supporting post 122 such that frame 120 may undergo z translations and slight x- and y-axis rotation. The supporting post 122 can therefore be independently raised and/or lowered by pneumatic control pistons 124 without inducing unnecessary flexing of frame 120.

Temperature control within chamber 104 is effected by a plurality of heating and/or cooling methods commonly employed in the arts. The preferred embodiment of the projection moiré and temperature control chamber 100 employs two heating sources. The first heating source is an infrared heating source 128 which is controlled by processor 116 through control cable 130. The infrared heating source 128 is placed slightly below and approximately centered under frame 120 such that when workpiece 24 (not shown) is positioned on frame 120, the infrared heating source 128 heats the workpiece 24 with radiating heat. Infrared heating source 128 may be operated either as a fixed heating source or as a variable heating source.

The preferred embodiment of the projection moiré and temperature control chamber 100, as illustrated in FIG. 4, employs a convection heating source 132 which is controlled by processing unit 116 through control cable 134. Convection heating source 132 uses a electric resistive heating elements (not shown) and a forced air fan (not shown) to move heated air into chamber 104. Convection heating source 132 may be operated as a fixed heating source or a variable heating source.

Alternative embodiments of the projection moiré and temperature control chamber 100, may employ only one heating source, or employ more than one heating source (hybrid heating). Heating sources may also include other commonly available types of heaters, such as but not limited to, infrared heaters, natural gas heaters, propane heaters, heating lamps, microwave heaters or the like so long as the temperature increases within chamber 104 can be controlled within a meaningful degree of accuracy according to the predefined temperature/time profile. The heating sources may provide for a constant temperature output or a variable temperature output.

The preferred embodiment of the projection moiré and temperature control chamber 100 also includes at least one cooling source 136 which is controlled by processing unit 116 through control cable 138. The cooling source 136, when used in combination with the infrared heating source 128 and the convection heating source 132, enables an accurate simulation of the predefined temperature/time profile within chamber 104. The cooling source 136 may be of any type commonly employed in the arts, such as, but not limited to, refrigerant cooling, heat exchanger, or the like.

Alternative embodiments of a projection moiré and temperature control chamber 100 may include a plurality of cooling sources. Also, cooling sources may provide for a constant temperature output or a variable temperature output.

Utilization of at least one cooling source 136 provides another benefit in that the projection moiré and temperature control chamber 100 may simulate thermal contraction of the workpiece under various cold temperature conditions. Thermal contractions as would occur in sub-freezing conditions may induce warpage in a workpiece. Such warpage induced by cold temperatures may be of interest particularly in harsh sub-freezing ambient field conditions which electronic hardware or other types of workpieces may be subjected to.

The preferred embodiment of the projection moiré and temperature control chamber 100 utilizes a blower 140 to circulate air in the chamber during the simulation of the predefined temperature/time profile. Blower 140 facilitates the maintenance of a constant temperature throughout the chamber 104. Alternative embodiments of a projection moiré and temperature control chamber 100 may employ a plurality of blowers 140 situated at convenient locations to ensure more accurate control of temperature in chamber 104. Also, the preferred embodiment of the projection moiré and temperature control chamber 100 includes an exhaust port fan 142 which may be used to vent gases out of chamber 104, thereby facilitating more accurate control of temperatures within chamber 104. For example, the predefined temperature/time profile may call for a rapid cooling of the air in chamber 104. When rapid cooling is needed, processor 116 could shut-off the infrared heating source 128 and/or the convection heating source 132 and turn-on cooling source 136. Blower 140 would circulate the incoming cooler air within the chamber 104 while the exhaust port fan 142 vents the hot air to the outside. Thus, one skilled in the art can appreciate that the plurality of heating sources, at least one cooling source, at least one blower and/or exhaust port fan would enable the projection moiré and temperature control chamber 100 to accurately simulate a predefined temperature/time profile within chamber 104.

Figure 5:
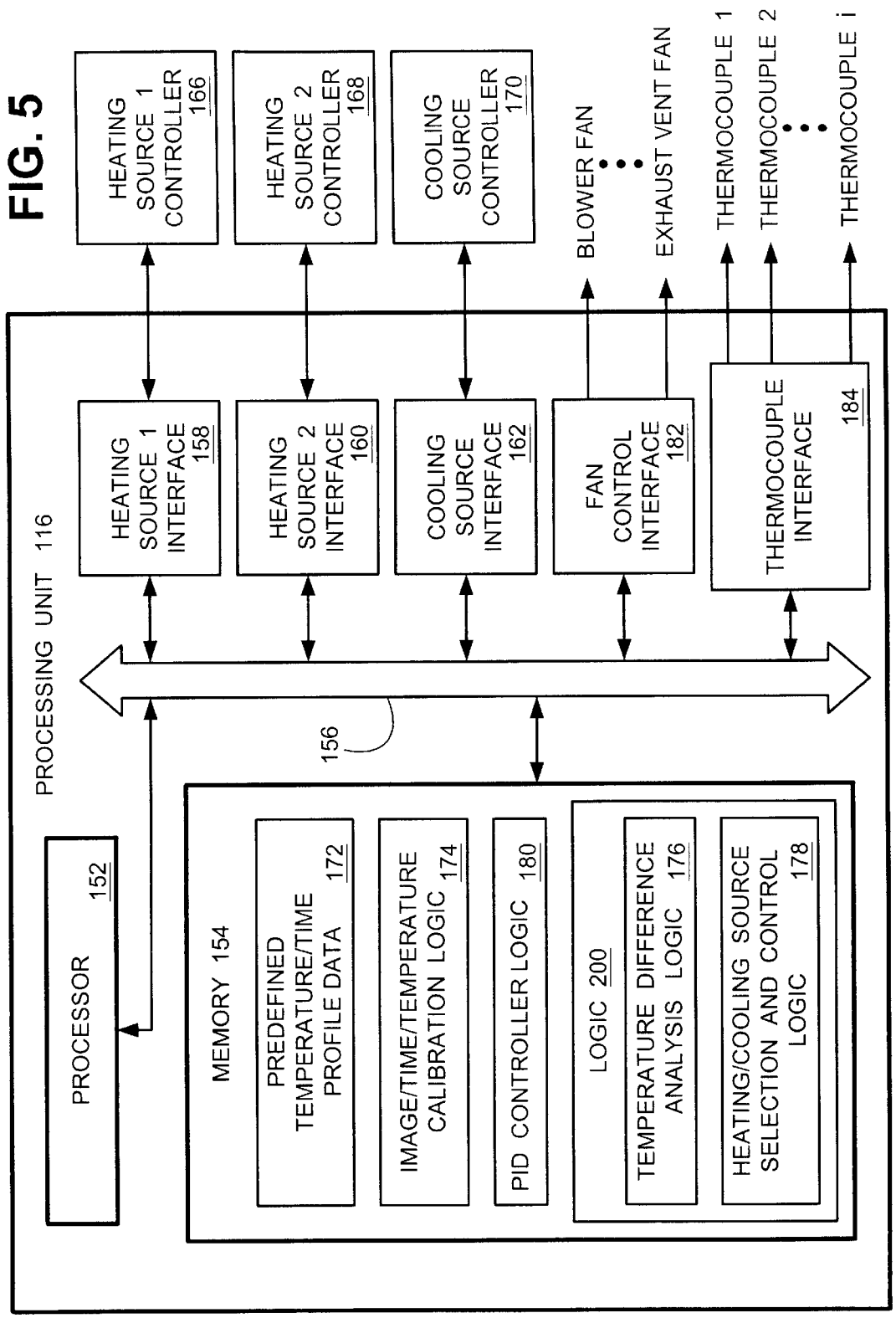
FIG. 5 is a block diagram illustrating components residing in the processing unit of FIG. 2.

FIG. 5 illustrates some of the components residing in processing unit 116 (FIG. 2) which implement the process of temperature regulation inside chamber 104 (FIGS. 2 and 4). Processing unit 116 typically contains many individual components aggregated together in a manner that performs a multitude of tasks associated with a processing unit, however, these other associated components are not relevant to an explanation of the projection moiré and temperature control chamber system 100 (FIG. 2) and are not shown in FIG. 5. Only those components significantly relevant to the temperature regulation function of the projection moiré and temperature control chamber system 100 are shown in FIG. 5 and described herein.

Processor 152, for example, a general purpose microprocessor, resides in processing unit 116 and is in communication with memory 154 over local interface bus 156. One of the functions of processor 152 is to control temperatures within chamber 104 (FIGS. 2 and 4) according to a predefined temperature/time profile. Also residing in processing unit 116 are interfaces to temperature control devices.

Heating source 1 interface 158, heating source 2 interface 160 and cooling source interface 162 are shown residing in processing unit 116. Heating source 1 interface 158 provides the connection to the heating source 1 controller 166.

Processor 152 can then provide the necessary control instructions through heating source 1 interface 158 such that heating source 1 controller 166 can control one of the plurality of heating sources, such as infrared heating source 128 (FIG. 4) or convection heating source 132. Similarly, processor 152 may control a second (different) heating source by providing instructions to heating source 2 controller 168 through heating source 2 interface 160. Alternative embodiments of the projection moiré and temperature control chamber system 100 which employ more than two heating sources would have a corresponding number of heating source interfaces residing in processing unit 116 and a corresponding number of heating source controllers which control the operation of each one of the additional heating sources.

Processor 152 controls the operation of cooling source 136 (FIG. 4) by providing instructions to cooling source controller 170 through the cooling source interface 162. Alternative embodiments of the projection moiré and temperature control chamber system 100 may employ a plurality of cooling sources. Additional cooling sources would be individually controlled by processor 152 through associated cooling source interfaces and associated cooling source controllers (not shown). Any such alternative embodiments of a projection moiré and temperature control chamber system 100 which employ additional heating sources and/or additional cooling sources, are intended to be within the scope of this disclosure and be protected by the accompanying claims for the projection moiré and temperature control chamber system 100.

Residing within memory 154 are data and program logic 200 (FIG. 6) configured to perform the temperature regulation function. Predefined temperature/time profile data 172 resides in memory 154 and is provided by the user prior to the initiation of a temperature/time simulation. Image/time/temperature calibration logic 174 resides in memory 154 to perform the function of associating with each image recorded by camera 36 (FIG. 2) with a corresponding time and temperature. Associating a time and temperature with each image is necessary for analysis of changes in moiré fringe patterns which indicate warpage in workpiece 24 (FIGS. 2 and 4). Temperature difference analysis logic 176, residing in memory 154, determines the difference between detected temperatures in chamber 104 (FIGS. 2 and 4) and the specified temperature associated with the particular simulation time specified by the predefined temperature/time profile. Based upon the difference in the actual temperatures in chamber 104 and the specified chamber temperature, processor 152 is able to determine necessary temperature changes and provide the required controller instructions to the heating source 1 controller 166, heating source 2 controller 168, and/or cooling source controller 170. The appropriate temperature control instructions provided to the heating and cooling sources is determined by the execution of the heating/cooling source selection and control logic 178 residing in memory 144. PID controller logic 180 residing in memory is supplemental logic which further enhances the ability of processing unit 116 to more accurately manage and control temperatures within chamber 104 (FIGS. 2 and 4).

Fan control interface 182 connects a plurality of fan controllers (not shown) residing in chamber 104 (FIGS. 2 and 4) such that processor 152 can control operations of the fans in blower 140 and/or the exhaust port fan 142 (FIG. 4).

Thermal couple interface 184 connects to the plurality of thermal couples residing in chamber 104 (FIGS. 2 and 4). Temperatures detected by the plurality of thermal couples are provided as inputs to the temperature difference analysis logic 164.

Figure 6:
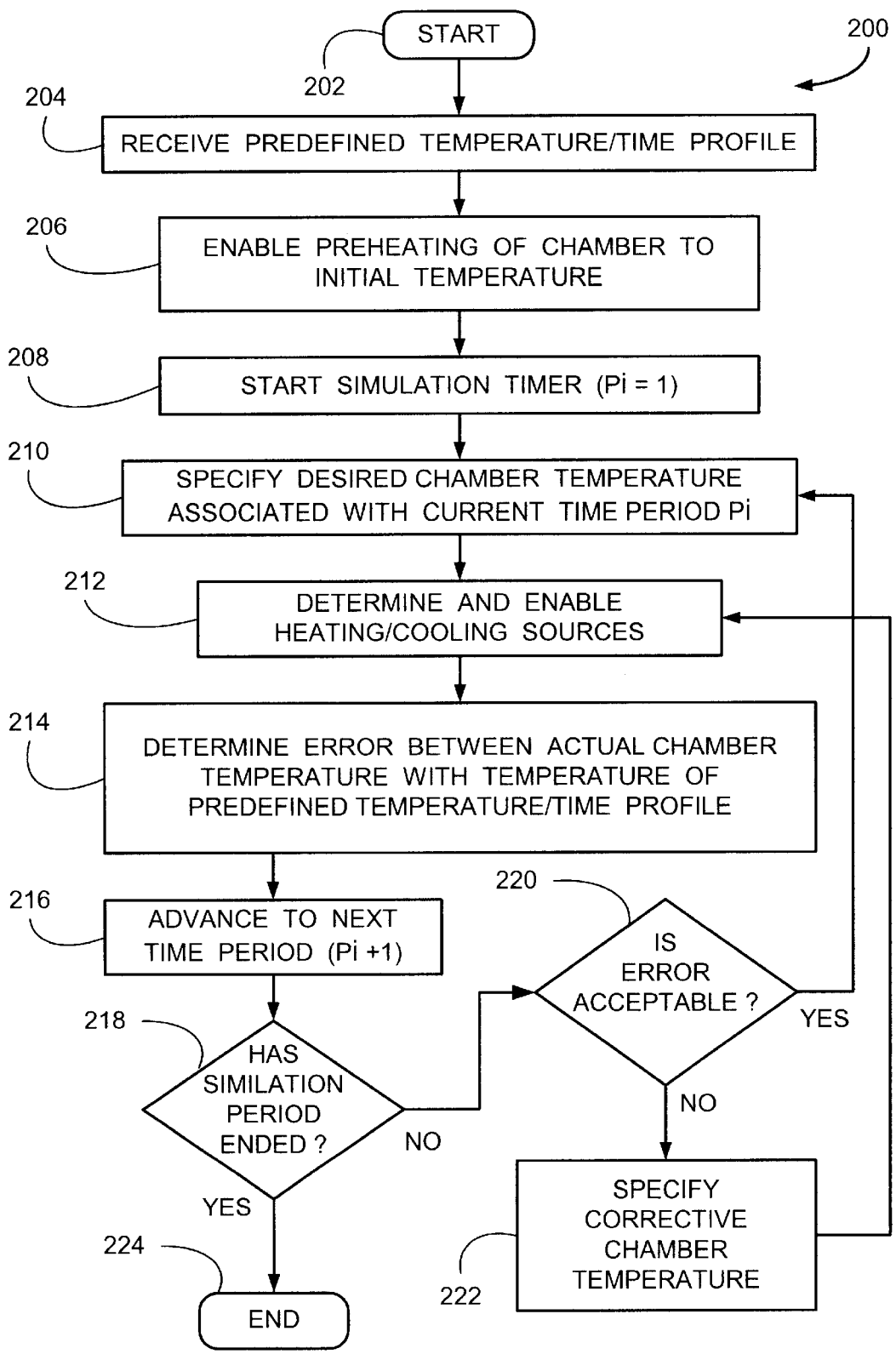
FIG. 6 is a flow chart showing a method of regulating temperature in the chamber of FIG. 4 according to a predefined temperature/time profile of FIG. 3.

FIG. 6 is a flow chart 200 illustrating the operation of the temperature regulation function which is executed by processing unit 116 (FIGS. 2 and 5). The flow chart 200 of FIG. 6 shows the architecture, functionality, and operation of a possible implementation of the software for implementing the temperature regulation function of the projection moiré and temperature control chamber system 100 (FIG. 2). In this regard, each block may represent a module, segment, or a portion of code, which comprises one or more executable instructions for implementing the specified logical function (s). It should also be noted that in some alternative implementations, the functions noted in the blocks may occur out of the order noted in FIG. 6 or may include additional functions without departing significantly from the functionality of the projection moiré and temperature control chamber system 100. For example, two blocks shown in succession in FIG. 6 may, in fact, be executed substantially concurrently. The blocks may sometimes be executed in reverse order, or some of the blocks may not be executed in all instances, depending upon the functionality involved, as will be further clarified hereinbelow.

The temperature regulation process begins at start block 202. At block 204, the predefined temperature/time profile 120 (FIG. 3) is received by processing unit 116 (FIG. 5) for storage in memory 144.

At block 206, the preheating of chamber 104 (FIGS. 2 and 4) to the initial temperature 124 (FIG. 3) is enabled. The heating sources and/or cooling sources are operated in a manner such that the initial temperature 124 (FIG. 3) is achieved within chamber 40 (FIGS. 2 and 4). This preheating process, enabled by block 206, corresponds to the preheat time period 122 (FIG. 3).

Once the preheating process of block 186 is completed, the simulation timer is started at block 208 where time period $P_i$ is set to 1. For convenience and efficiency, the time period associated with the predefined temperature/time profile is divided into a series of discrete time periods. Thus, the predefined temperature/time profile can be viewed as a series of chamber temperatures associated with a series of discrete time periods, $P_i$.

At block 210, the desired chamber temperature associated with the current time period $P_i$ is specified. Then, at block 212, the appropriate heating/cooling sources will be determined and enabled. Since the preheating process of block 186 has already adjusted the actual chamber temperature to the desired initial temperature 124 (FIG. 3), no action is taken at block 212 at the start of the simulation. At block 214 which determines the difference between the actual chamber temperature and the desired chamber temperature associated with the time period $P_i$. At the start of the simulation, this temperature difference is zero or approximately zero since the actual chamber temperature has been preheated to the initial temperature 124°.

At block 216, the simulation advances to the next time period ($P_i$ is incremented by 1 time period). At block 218, a determination is made whether the simulation period has ended. If not (the NO condition), the process proceeds to block 220 wherein a determination is made whether or not the error between the actual chamber temperature and the desired chamber temperature, as specified by the predefined temperature/time profile, is acceptable. If the error between the actual temperature and the specified temperature is acceptable (the YES condition), the process proceeds to block 210 wherein a new desired chamber temperature is specified for the current time period.

If at block 220 the error is not acceptable (the NO condition), the process proceeds to block 222. At block 222, a corrective chamber temperature is specified such that the chamber temperature will be heated or cooled in a manner such that the actual chamber temperature will converge with the desired chamber temperature as specified by the predefined temperature/time profile. In the preferred embodiment, processor 152 would execute PID controller logic 180 (FIG. 5) to more efficiently effect the convergence of the actual chamber temperature with the desired chamber temperature. The process then proceeds back to step 192 such that processor 152 (FIG. 5) determines and enables the appropriate heating/cooling sources.

The process continues through the above-described manner until, at block 198, a determination that the simulation period has ended (the YES condition). The process then terminates at block 224.

As previously described in association with FIG. 2, the preferred embodiment of the projection moiré and temperature control chamber system 100 has manual controls 110 which may be used to manually override temperature control provided by the processing unit 116. That is, at any point during the simulation the user may manually override the simulation process and terminate the process. Logic to implement the simulation termination process is not detailed in FIG. 6. However, one skilled in the art will realize a termination process can be initiated from any of the blocks shown in FIG. 6 without adversely impacting the functionality or operation of the temperature regulation logic of FIG. 6.

Figure 7:
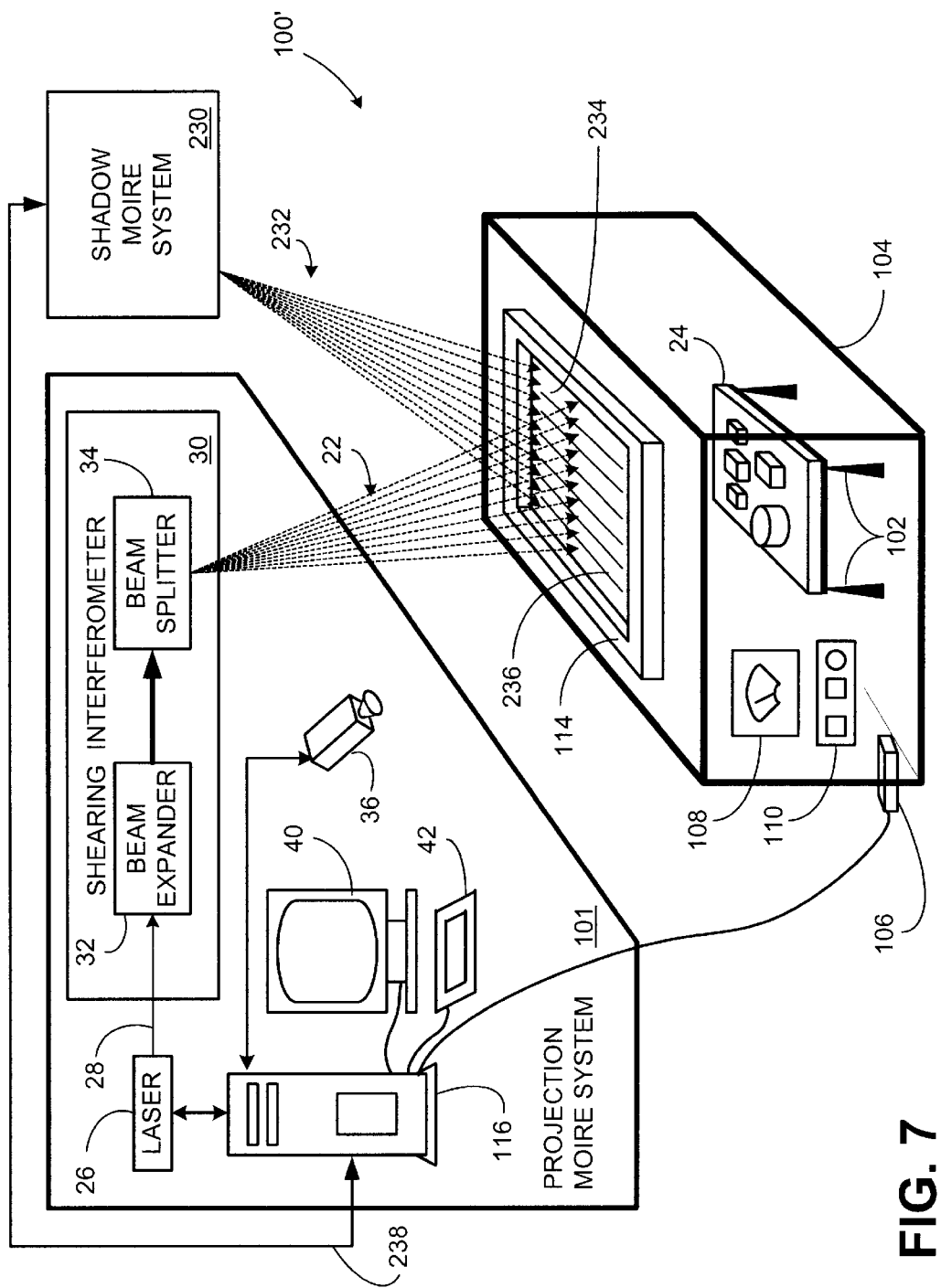
FIG. 7 is a schematic of the projection moiré and temperature control chamber system of FIG. 2 with the addition of a supplemental shadow moiré system.

FIG. 7 is a simplified illustration of an alternative embodiment of the projection moiré and temperature control chamber system 100' further including a shadow moiré system 230 which may be used as a supplemental alternative to the laser beam generated fringe patterns from the projection moiré system 101. The shadow moiré system 230 uses a visible spectrum light source which projects a plurality of visible light beams 232 resulting in a plurality of moiré fringe patterns formed on workpiece 24. Shadow moiré system 230 projects a plurality of visible light beams 232 through glass cover 234 onto workpiece 24. Glass cover 234 has a plurality of grating lines 236 embedded throughout the entire glass cover 234 (only a portion of the grading lines 236 are shown for convenience). Glass cover 234, in the alternative embodiment of the projection moiré and temperature control chamber system 100', must be placed into the position as shown before the shadow moiré system 230 may be used. Thus, glass cover 234 may be placed directly over glass cover 112, may be attached to a suitable hingeable frame (not shown) which allows glass cover 234 to be placed in the proper position, or be placed into the proper position by any other suitable methods employed in the art. Shadow moiré system is also in communication with processing unit 116 and is controlled by processing unit 116 via line 238.

It should be emphasized that the above-described embodiments of the present invention, particularly, and "preferred" embodiments or configurations, are merely possible examples of implementation, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

What is claimed:

1. A method for measuring thermally induced warpage, the method comprising the steps of:

positioning a workpiece in a chamber;
projecting a plurality of fringe patterns on said workpiece;
regulating temperature in said chamber during simulation of a predefined temperature/time profile;
recording images of said fringe patterns-projected on said workpiece;
analyzing changes in said plurality of fringe patterns; and
maintaining position of a reference point associated with said workpiece at a fixed position in space during simulation of the predefined temperature/time profile.

2. The method of claim 1, wherein said step of regulating temperature further includes changing temperature in said chamber according to a plurality of predefined temperature values corresponding to a plurality of predefined times.

3. The method of claim 1, wherein said step of projecting is effected with a shadow moiré system.

4. The method of claim 1, wherein said step of regulating temperature further includes the step of heating effected by a plurality of heating sources.

5. The method of claim 1, wherein said step of regulating temperature further includes venting hot gases such that hot gases residing in said chamber are expelled from said chamber.

6. The method of claim 1, wherein said step of regulating temperature further includes the step of blowing gases residing in said chamber effected by at least one blower residing in said chamber.

7. The method of claim 1, wherein said step of projecting is effected with a projection moiré system.

8. The method of claim 7, wherein said step of projecting is effected with a shadow moiré system.

9. The method of claim 1, wherein said step of regulating temperature further includes the step of heating effected by at least one heating source.

10. The method of claim 9, wherein said at least one heating source is a variable output heating source such that said step of heating is effected by adjusting an output temperature of said variable output heating source.

11. The method of claim 1, wherein said step of regulating temperature further includes the step of cooling effected by at least one cooling source.

12. The method of claim 11, wherein said at least one cooling source is a variable output cooling source such that said step of cooling is effected by adjusting an output temperature of said variable output cooling source.

13. The method of claim 1, further comprising the step of:
detecting motion of said reference point as temperature is regulated in said chamber; and
adjusting at least one support post holding said workpiece such that position of said reference point is maintained at a fixed position in space as thermally induced warpages are induced in said workpiece during simulation of the prefined temperature/time profile.

14. A system for measuring thermally induced warpage, comprising:
means for positioning a workpiece in a chamber;
means for projecting a plurality of fringe patterns on said workpiece;
means for regulating temperature in said chamber;
means for recording images of said fringe patterns projected on said workpiece;
means for analyzing changes in said plurality of fringe patterns; and
means for maintaining position of a reference point associated with said workpiece at a fixed position in space during simulation of a predefined temperature/time profile.

15. The system of claim 14, wherein said means for regulating temperature further includes means for changing temperature in said chamber to a plurality of predefined temperature values corresponding to a plurality of predefined times.

16. The system of claim 14, wherein said means for projecting is effected with a shadow moiré system.

17. The system of claim 14, wherein said means for regulating temperature further includes means for heating effected by a plurality of heating means.

18. The system of claim 14, wherein said means for regulating temperature further includes means for blowing gasses residing in said chamber.

19. The system of claim 14, wherein said means for projecting is effected with a projection moiré system.

20. The system of claim 19, wherein said means for projecting is effected with a shadow moiré system.

21. The system of claim 14, wherein said means for regulating temperature further includes means for heating effected by at least one heating means.

22. The system of claim 21, wherein said means for heating is a variable output heating means such that heating is effected by adjusting an output temperature of said variable output heating means.

23. The system of claim 14, wherein said means for regulating temperature further includes means for cooling effected by at least one cooling means.

24. The system of claim 23, wherein said means for cooling is a variable output cooling means such that cooling is effected by adjusting an output temperature of said variable output cooling means.

25. The system of claim 14, wherein said means for regulating temperature further includes means for venting hot gasses such that hot gasses residing in said chamber are expelled from said chamber.

26. A system for measuring thermally induced warpage, comprising:
   a projection moiré system, wherein said projection moiré system projects a plurality of fringe patterns on a workpiece;
   a chamber, wherein said workpiece is positioned;
   at least one heating source wherein temperature in said chamber may be increased;
   at least one cooling source wherein temperature in said chamber may be decreased, such that thermally induced warpages induced in said workpiece may be analyzed; and
   a moveable frame wherein said workpiece is secured thereto such that position of a reference point associated with said workpiece is maintained at a fixed position in space as thermally induced warpages are induced in said workpiece during simulation of a predefined temperature/time profile.

27. The system of claim 26, further comprising a plurality of heating sources.

28. The system of claim 26, wherein said at least one heating source is a variable output heating source such that heating is effected by adjusting an output temperature of said variable output heating source.

29. The system of claim 26, wherein said at least one cooling source is a variable output cooling source such that cooling is effected by adjusting an output temperature of said variable output cooling source.

30. The system of claim 26, wherein said projection moiré system further comprises a processor such that changes on warpage in said workpiece induces by increase and decreases in temperature in said chamber may be analyzed.

31. The system of claim 26, further comprising a vent such that hot gasses residing in said chamber are expelled from said chamber.

32. The system of claim 26, further comprising at least one blower residing in said chamber such that hot gasses residing in said chamber are circulated.

33. The system of claim 26, further comprising:
   a position detector which detects the position of a reference point on said workpiece;
   a plurality of adjustable support posts attached to said moveable frame; and
   a position controller wherein said position controller detects movement of said reference point and transmits commands to said adjustable support posts, such that said reference point is maintained at a fixed position in space during simulation of the predefined temperature/time profile.

34. The system of claim 26, further comprising:
   a position detector which detects the position of a reference point on said moveable frame;
   a plurality of adjustable support posts attached to said moveable frame;
   a position controller wherein said position controller detects movement of said reference point; and
   an adjusting means connected to said adjustable support posts such that said adjusting means adjusts said adjustable support posts according to a plurality of commands received from said position controller, such that said reference point is maintained at a fixed position in space during simulation of the predefined temperature/time profile.

35. A computer readable medium having a temperature control program, the program comprising logic configured to perform the steps of:
   regulating temperature in a chamber;
   storing a plurality of images recorded by a camera of a plurality of fringe patterns projected onto a workpiece;
   analyzing changes in said plurality of fringe patterns; and
   determining motion of a reference point associated with said workpiece based upon information provided by at least one position detector; and
   controlling at least one support post holding said workpiece such that position of said reference point is maintained at a fixed position in space as thermally induced warpages are induced in said workpiece during simulation of a predefined temperature/time profile.

* * * * *

UNITED STATES PATENT AND TRADEMARK OFFICE
CERTIFICATE OF CORRECTION

PATENT NO.         : 6,564,166 B1
APPLICATION NO. : 09/611394
DATED               : May 13, 2003
INVENTOR(S)       : Ume et al.

It is certified that error appears in the above-identified patent and that said Letters Patent is hereby corrected as shown below:

Column 2, Line 50, delete "34" and replace with --30--.
Column 2, Line 56, delete "interferometer".
Column 3, Line 8, delete ".".
Column 5, Line 67, delete "98" and replace with --101--.
Column 6, Line 39, delete "120" and replace with --300--.
Column 6, Line 43, delete "120" and replace with --300--.
Column 6, Line 50, delete "120" and replace with --300--.
Column 6, Line 54, delete "120" and replace with --300--.
Column 6, Line 55, add --FIG. 2-- after "processor 116".
Column 6, Line 59, delete "120" and add --300--.
Column 6, Line 60, delete "122" and add --302--.
Column 6, Line 63, delete "126" and add --306--.
Column 6, Line 65, add --FIG. 2-- after "workpiece 24".
Column 6, Line 67, delete "128" and add --308--.
Column 7, Line 3, delete "130" and add --130--.
Column 7, Line 6, delete "132" and add --312--.
Column 7, Line 11, delete "134" and add --314--.
Column 7, Line 13, delete "120" and add --300--.
Column 7, Line 14, delete "120" and add --300--.
Column 7, Line 18, delete "126" and add --306--.
Column 7, Line 21, delete "128" and add --308--.
Column 7, Line 21, delete "130" and add --310--.
Column 7, Line 24, delete "132" and add --312--.
Column 7, Line 35, delete "120" and add --300--.
Column 7, Line 30, delete "120" and add --300--.
Column 7, Line 39, delete "122" and add --302--.
Column 7, Line 39, delete "124" and add --304--.
Column 7, Line 41, delete "124" and add --304--.
Column 7, Line 43, delete "124" and add --304--.
Column 7, Line 46, delete "120" and add --300--.
Column 7, Line 48, delete "126" and add --306--.

UNITED STATES PATENT AND TRADEMARK OFFICE
CERTIFICATE OF CORRECTION

PATENT NO. : 6,564,166 B1
APPLICATION NO. : 09/611394
DATED : May 13, 2003
INVENTOR(S) : Ume et al.

It is certified that error appears in the above-identified patent and that said Letters Patent is hereby corrected as shown below:

Column 7, Line 48, delete "128" and add --308--.
Column 7, Line 49, delete "130" and add --310--.
Column 7, Line 53, delete "120" and add --300--.
Column 7, Line 58, delete "120" and add --300--.
Column 7, Line 65, add --FIG. 4-- after "cooling source 136".
Column 8, Line 5, delete "120" and add --300--.
Column 8, Line 7, add --FIG. 2--.
Column 8, Line 9, delete "39" and add --116 (FIG. 2)--.
Column 8, Line 22, add --FIG. 2-- after "workpiece 24".
Column 8, Line 27, delete "130" and add --310--.
Column 8, Line 31, delete "120 (FIG. 3)" and add --300--.
Column 8, Line 32, delete "120" and add --300--.
Column 8, Line 45, delete "not shown" and add --FIG. 2--.
Column 8, Line 55, add --FIG. 2-- after "processing unit 116".
Column 9, Line 7, delete "a" after the word "such".
Column 9, Line 29, add --FIG. 2-- after "processor 116".
Column 9, Line 31, add -- FIG. 2-- after "workpiece 24" and delete "not shown".
Column 9, Line 61, add --FIG. 2--after "processing unit 116".
Column 10, Line 33, add --FIG. 2-- after "processor 116".
Column 10, Line 44, delete "FIG. 2".
Column 10, Line 29, add --FIG. 2-- after "processor 116".
Column 11, Line 5, add --FIG. 2-- after "heating source 132".
Column 11, Line 10, add --FIG. 2-- after "system 100".
Column 11, Line 19, add --FIG. 2-- after "system 100".
Column 11, Line 46, add--FIGs. 2 and 4-- after "chamber 104".
Column 11, Line 54, delete "144" and add --154--.
Column 11, Line 63, delete "Thermal couple" and add --Thermocouple--.
Column 11, Line 67, delete "164" and add --176--.
Column 12, Line 25, delete "144" and add --154 (FIG. 5)--.
Column 12, Line 27, delete "124" and add --304--.

UNITED STATES PATENT AND TRADEMARK OFFICE
CERTIFICATE OF CORRECTION

PATENT NO. : 6,564,166 B1
APPLICATION NO. : 09/611394
DATED : May 13, 2003
INVENTOR(S) : Ume et al.

It is certified that error appears in the above-identified patent and that said Letters Patent is hereby corrected as shown below:

Column 12, Line 29, delete "124" and add --304--.
Column 12, Line 29, delete "40" and add --104--.
Column 12, Line 32, delete "122" and add --302--.
Column 12, Line 33, delete "186" and add --206--.
Column 12, Line 45, delete "186" and add --206--.
Column 13, Line 6, add --FIG. 5-- after "processor 152".
Column 13, Line 9, delete "192" and add --212--.
Column 13, Line 13, delete "198" and add --218--.
Column 13, Line 31, delete " ' "after the number "100".
Column 13, Line 47, add --FIG. 2-- after "cover 112".

Signed and Sealed this

Tenth Day of October, 2006

JON W. DUDAS
*Director of the United States Patent and Trademark Office*